United States Patent [19]

Ejchler et al.

[11] Patent Number: 4,966,290

[45] Date of Patent: Oct. 30, 1990

[54] VEHICLE FOR MANIPULATING PIPE

[75] Inventors: Henry Ejchler, East Peoria; Derrell G. Jones, Washington, both of Ill.

[73] Assignee: Caterpillar Inc., Peoria, Ill.

[21] Appl. No.: 420,500

[22] Filed: Oct. 12, 1989

[51] Int. Cl.$^5$ ............................................. B66C 23/26
[52] U.S. Cl. ................................... 212/258; 212/180; 212/182; 212/187; 212/261; 403/164
[58] Field of Search ............... 212/258, 175, 180, 181, 212/182, 188, 261, 229, 187; 172/830, 831; 403/53, 54, 161, 164, 315, 316

[56] References Cited

U.S. PATENT DOCUMENTS

| D. 263,051 | 2/1982 | Allen | D15/24 |
|---|---|---|---|
| 1,457,397 | 6/1923 | Shafer | 212/180 |
| 2,867,922 | 1/1959 | Allin | 403/164 |
| 3,039,576 | 6/1962 | Stilley | 192/0.094 |
| 3,247,987 | 4/1966 | Lake | 214/147 |
| 3,648,957 | 3/1972 | Paulson et al. | 212/229 |
| 3,732,988 | 5/1973 | Lamer | 212/187 |
| 3,842,983 | 10/1974 | Dolza | 212/8 R |
| 3,938,669 | 2/1976 | Vinton | 212/8 B |
| 4,023,625 | 5/1977 | Krolak et al. | 172/831 |
| 4,042,116 | 8/1977 | Bertolino | 212/140 |
| 4,083,459 | 4/1978 | Allen | 212/8 B |
| 4,130,204 | 12/1978 | Pickard | 214/1 PA |
| 4,512,524 | 4/1985 | Shigemizu | 403/164 |

FOREIGN PATENT DOCUMENTS

| 47705 | 5/1977 | Japan | 212/261 |
|---|---|---|---|
| 48007 | 7/1980 | U.S.S.R. | 212/258 |

*Primary Examiner*—Sherman Basinger
*Assistant Examiner*—Thomas J. Brahan
*Attorney, Agent, or Firm*—Claude F. White

[57] ABSTRACT

A vehicle for manipulating large diameter pipe includes a vehicle frame assembly which supports an auxiliary pipelayer frame. The pipelayer frame supports various components for manipulating the pipe, including a boom arm and a fluid cylinder for raising and lowering the boom arm. During transportation of the vehicle, certain components must be removed from the vehicle to make the vehicle conform to width and height restrictions. Normally, the boom arm and the fluid cylinder would be removed. The subject invention provides for storage of the fluid cylinder on the vehicle during transportation, without the necessity to disconnect fluid lines. Considerable time and effort is saved during disassembly and re-assembly of the vehicle components.

12 Claims, 5 Drawing Sheets

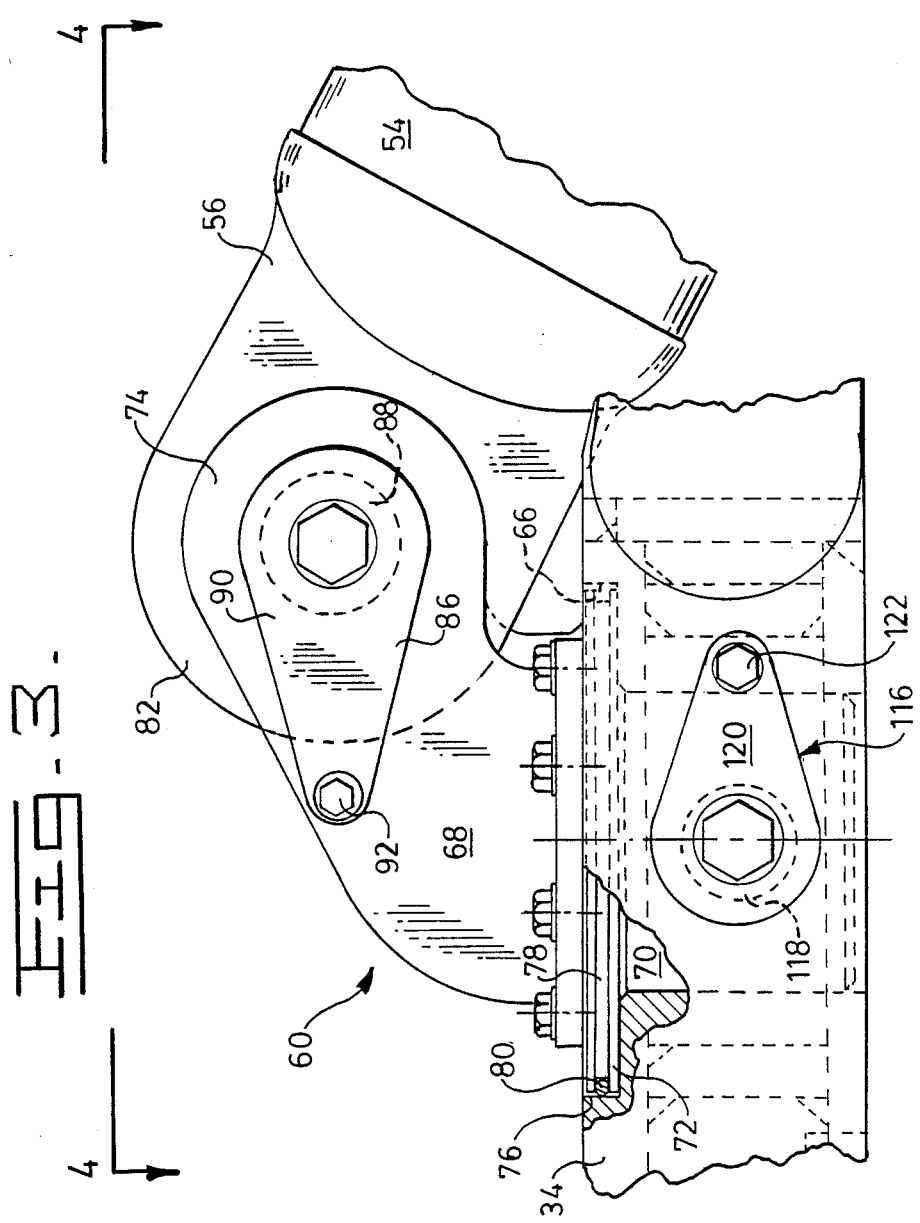

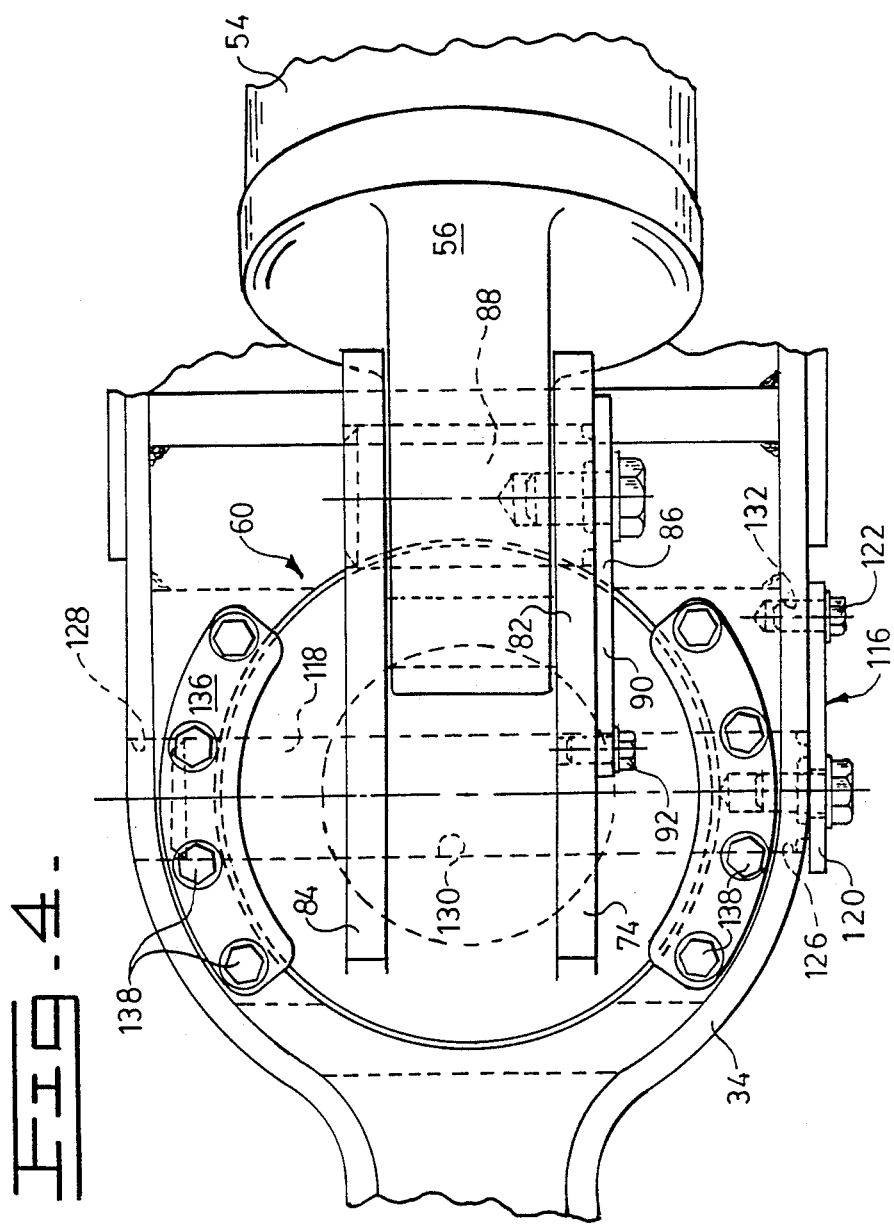

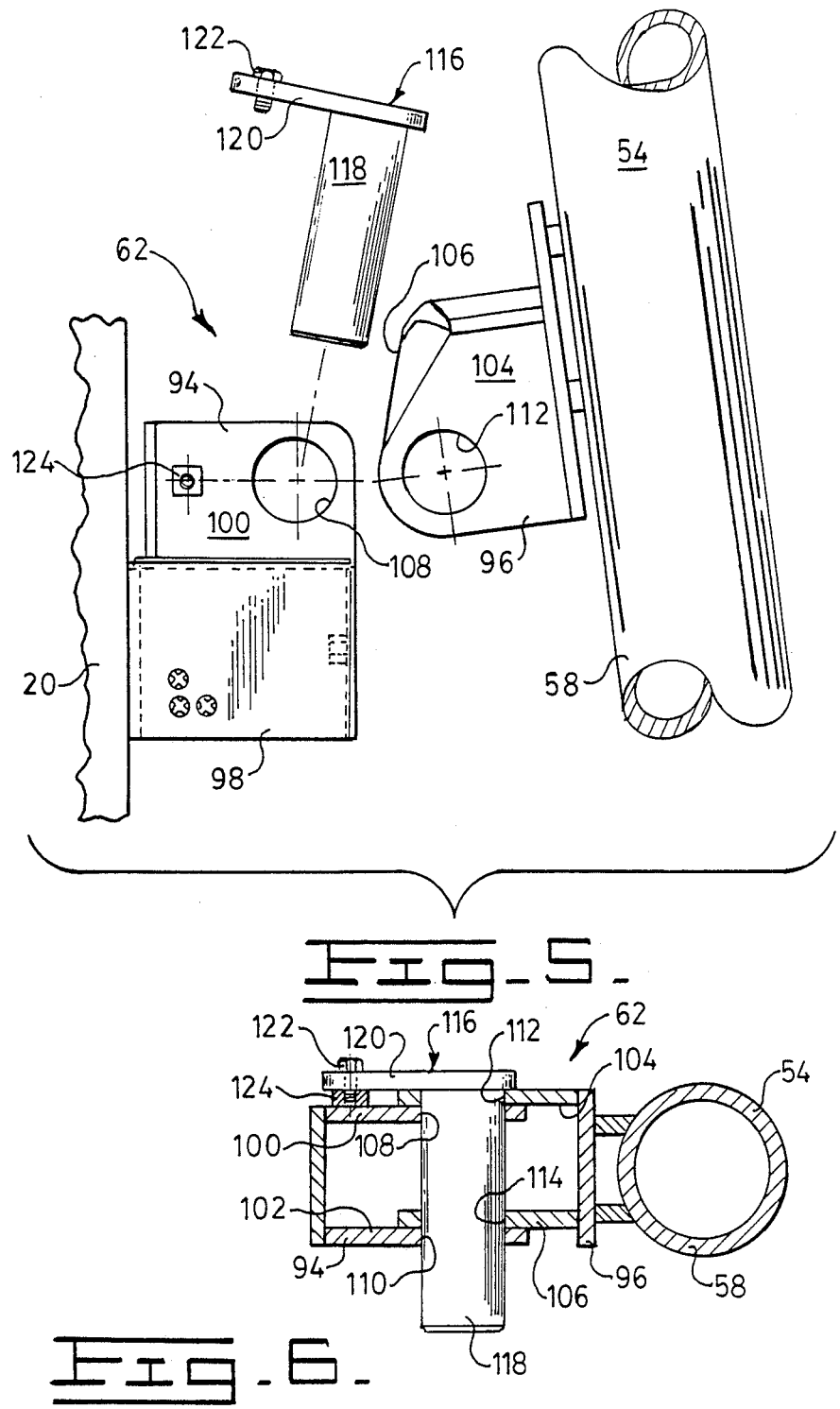
Fig_5_
Fig_6_

VEHICLE FOR MANIPULATING PIPE

TECHNICAL FIELD

This invention relates generally to a vehicle for manipulating large diameter pipe and more particularly to such a vehicle having a boom arm, a fluid operated cylinder to raise and lower the boom arm, and to apparatus and method for positioning and storing the fluid operated cylinder during transportation of the vehicle.

BACKGROUND ART

Construction vehicles which manipulate large diameter pipes for construction of pipelines are a specialized type of vehicle, and are generally referred to as "pipelayers". These pipelayers are equipped with specialized tools and frames for supporting and manipulating the large heavy pipe sections. Such tools and frames generally include a pipe supporting boom arm, a counterweight assembly, a draw works or winch assembly, and a pipelayer frame assembly for supporting the boom arm, the counterweight assembly, and the drawworks. Most prior art pipelayers utilize a cable connected between the drawworks and the boom arm, and by running the cable in or out, the boom arm and the pipe are raised and lowered.

More recently, fluid powered linear motors, or cylinders, have been utilized to replace the drawworks and cable for controlling the raising and lowering of the boom arm and pipe. One type of such a device is shown in U.S. Pat. No. 4,042,116, issued to G. M. Bertolino on Aug. 16, 1977. In this patent, maneuvering of the movable boom is controlled by a large hydraulic jack. The jack is connected between one end of the boom and a supplemental support or framework. Another type of structure for maneuvering a boom or jib is shown in U.S. Pat. No. 3,842,983, issued to C. Dolza on Oct. 22, 1974. In this patent, the jib is raised and lowered, and pivoted laterally, by a plurality of hydraulic jacks.

In each of the above noted boom manipulating devices, removal of the boom would normally be necessary to transport the vehicle for a considerable distance. With the boom removed, one end of the cylinder, or cylinders, becomes unsupported, which requires the cylinders to be removed or stored on the machine in some manner. Removal of the fluid cylinders necessitates disconnecting and plugging of several fluid lines. The possibility of fluid loss and contamination of the fluid system is always a concern when fluid lines are disconnected. When the fluid cylinders are removed, they must be stored and shipped separately, thereby requiring additional space and effort. Also, considerable time and effort are required to re-assemble the fluid cylinders to the vehicle.

The present invention is directed to overcoming one or more of the problems as set forth above.

DISCLOSURE OF THE INVENTION

In one aspect of the present invention, a vehicle for manipulating large diameter pipe has a main frame assembly having opposed sides, first and second track assemblies, each being connected to a respective side of the mainframe assembly, with each track assembly having a roller frame. The vehicle further includes a pipelayer frame having a first portion secured to the main frame assembly and a second portion secured to one of the track roller frames, a boom arm connectable to the pipelayer frame, a fluid powered cylinder connectable to the pipelayer frame and the boom arm, and means for rotating the cylinder and supporting it on the main frame assembly.

Pipelaying vehicles, which utilize one or more fluid powered cylinders for maneuvering a pipe supporting boom arm, are generally partially disassembled when the machine is transported for a considerable distance. Partial disassembly is required because the width and/or height of the vehicle exceeds allowable transporting limits. When removing fluid cylinders from a vehicle, fluid lines must be disconnected and plugged, with the possibility of contamination of the fluid system. With the fluid cylinders removed, they must be stored somewhere and shipped separately, thereby requiring additional handling and storage space.

The subject invention provides supporting and storage of a fluid cylinder on a vehicle without disconnecting the fluid lines. Transporting of the vehicle is thereby possible without removal of the fluid cylinder from the vehicle. Less time and effort are thereby required to re-attach the fluid cylinder to the boom arm when the vehicle reaches it work site.

BRIEF DESCRIPTION OF THE DRAWINGS

FIG. 3 is a diagrammatic front elevational view, on an enlarged scale, of a support member and a portion of a fluid cylinder as shown in FIG. 1;

FIG. 4 is a diagrammatic plan view taken generally along lines 4—4 of FIG. 3;

FIG. 5 is a diagrammatic plan view, on an enlarged scale of the apparatus for connecting and supporting the fluid cylinder on the vehicle; and FIG. 6 is a diagrammatic sectional view taken generally along lines 6—6 of FIG. 2.

BEST MODE FOR CARRYING OUT THE INVENTION

Figure 1:
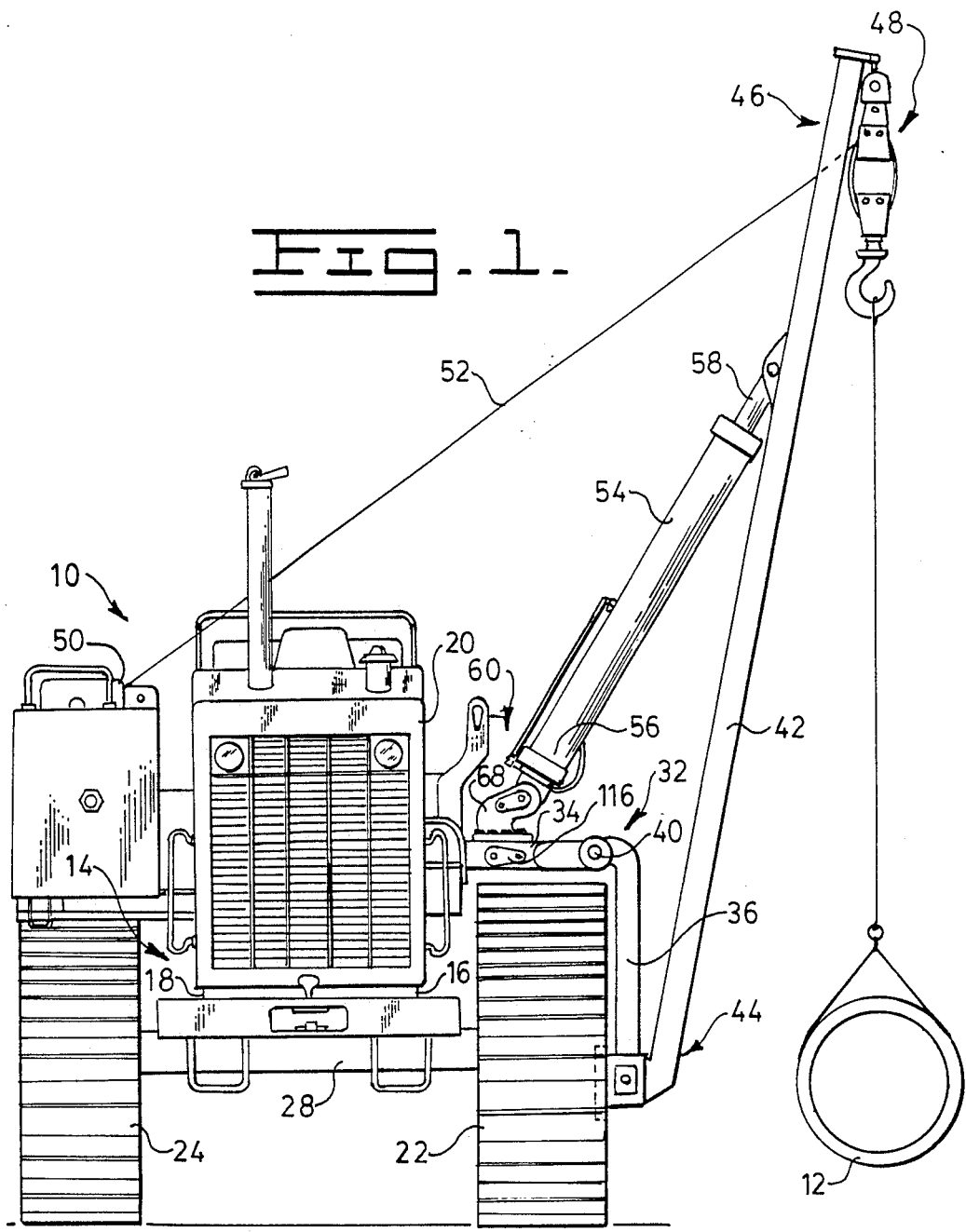
FIG. 1 is a diagrammatic front elevational view of vehicle incorporating the subject invention.
Figure 2:
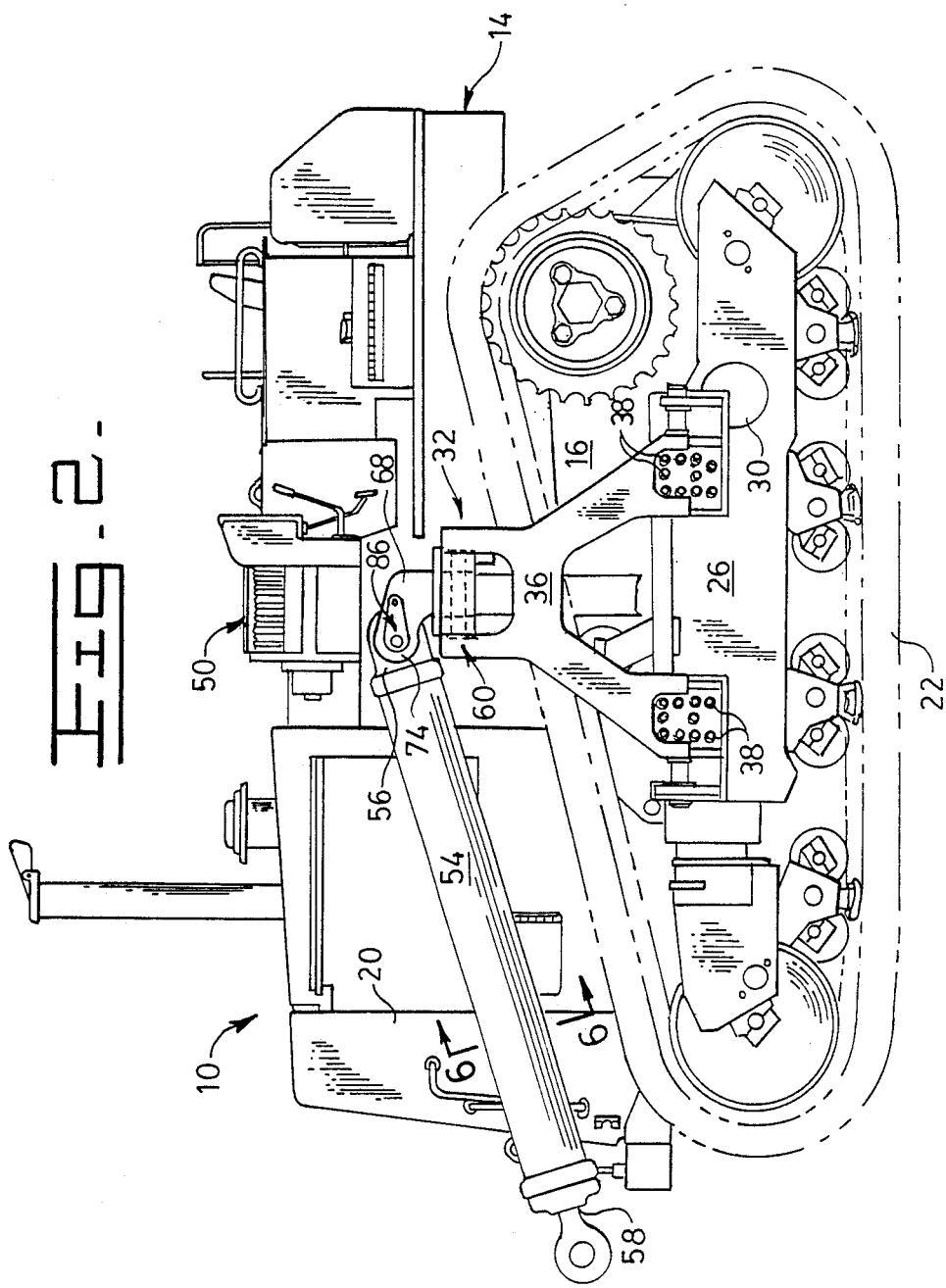
FIG. 2 is a diagrammatic side elevational view of the vehicle shown in FIG. 1 with the boom arm removed and the fluid cylinder in the stored position.

Referring to the drawings, a self-laying track-type vehicle 10 for supporting and manipulating a large diameter pipe 12 has a main frame assembly 14 having first and second opposed sides 16 and 18 and a radiator guard 20. The vehicle 1? includes first and second endless self-laying track assemblies 22,24, with each of the track assemblies 22,24 having a roller frame 26. A rigid cross bar 28 and a pivot shaft 30 connect each track assembly 22,24 to a respective side 16,18 of the main frame assembly 14. A pipelayer frame 32 has a first portion 34 secured to the main frame assembly 14 and a second portion 36 secured to one of the roller frames 26 by a plurality of fasteners 38. The first portion 34 is joined to the second portion 36 by a pin arrangement 40.

A pipe supporting boom arm 42 has a first end portion 44, pivotally connected to the pipelayer frame second portion 36, and a second end portion 46 supporting a cable operated load block assembly 48. A drawworks 50 runs a cable 52 in and out to raise and lower the block assembly and the pipe 12. A fluid operated cylinder 54 has a first end portion 56 connected to the pipelayer frame 32 and a second end portion 58 releasably connected to the boom arm second and portion 46. The vehicle 10 further includes a first means 60 for rotating the cylinder 54 when the second end portion 58 is disconnected from the boom arm second end portion 46, and a second means 62 for supporting the second end portion 58 on the main frame assembly 14.

With particular reference to FIGS. 3 and 4, the first means 60 includes a recessed socket or bore 64 and a counterbore 66 defined within the pipelayer frame first portion 34, and a cylinder support member 68. The support member 68 has a shaft portion 70, a radially extending flange portion 72, and a connecting portion 74. The shaft portion 70 is adopted to fit within and mate with the bore 64 and the flange portion 72 is adapted to fit within and be seated in said counterbore 66. The flange portion 72 has an outer circumferential wall 76 which defines a groove 78. A sealing member 80 is positioned within the groove 78 and serves to seal the bore 64 and counterbore 66 against dirt and foreign material. The connecting portion 74 is bifurcated to form first and second spaced apart walls 82,84. The connecting portion 74 is adapted to receive and support the first end portion 56 of the cylinder 54 between the walls 82,84. A first retaining pin assembly 86 pivotally secures the cylinder first end portion 56 between the first and second walls 82,84. The first pin assembly 86 includes a pin 88, a flange 90 secured to the pin 88, as by welding, and a threaded fastener 92 which secures the flange 90 to the first wall 82.

With particular reference to FIGS. 5 and 6, the second means 62 for supporting the second end portion 58 of the fluid cylinder 54 includes a first bifurcated bracket assembly 94 which is secured to the radiator guard 20 of the main frame assembly 14, and a second bifurcated bracket assembly 96 which is secured to the second end portion 58 of the fluid cylinder 54. The first bracket assembly 94 is actually secured to a step 98, which in turn is fastened to the radiator guard 20. The first bracket 94 includes first and second spaced apart parallel plates 100,102 and the second bracket assembly 96 includes third and fourth spaced apart parallel plates 104,106. The plates 100 and 102 define respectively aligned through holes 108,110 and the plates 104,106 define respectively aligned through holes 112,114. A second retaining pin assembly 116 is adapted to secure the first and second bracket assemblies 94,96 together. The second retaining pin assembly includes a pin portion 118, and a threaded fastener 122 which penetrates the flange portion 120. With the first and second bracket assemblies 94,96 engaged in overlapping relationship, as shown in FIG. 6, the pin portion 118 penetrates the aligned holes 108,110,112,114 and secures the bracket assemblies 94,96 together. A threaded block 124 is secured to the first plate 100 and the threaded fastener 122 engages the block 124 to secure the second pin assembly 116 in place.

With particular reference to FIGS. 3 and 4, the second retaining pin assembly 116, previously described with respect to FIGS. 5 and 6, and used to secure the first and second bracket assemblies 94,96 together is also used to secure the support member 68 to the pipelayer frame first portion 34. The pin portion 118 penetrates aligned holes 126,128 defined in the pipelayer frame first portion 34 and a similar aligned hole 130 defined in the shaft portion 70 of the support member 68. The threaded fastener 122 threads into a mating threaded hole 132 defined in the pipelayer frame first portion 34 to secure the second pin assembly 116 in place.

First and second arcuately shaped retaining plates 134,136 are fastened to the pipelayer frame first portion 34 by a plurality of threaded fasteners 138. The retaining plates 134,136 overlap the counterbore 66 and the flange 72 to secure the support member 68 within the pipelayer frame first portion 34 when the pin assembly 116 is removed, while still allowing the shaft portion 70 and the flange portion 72 to rotate within the bore 64 and the counterbore 66 respectively. When the pin assembly 116 has been removed from engagement with the pipelayer frame first portion and the shaft portion 70, it can be used to secure the first and second bracket assemblies 94,96 together, as previously noted.

Industrial Applicability

With reference to the drawings, the subject vehicle is particularly useful for manipulating pipe and more specifically, for positioning and storing certain of the vehicle pipelaying components on the vehicle during transportation of the vehicle from one location to another.

Prior to transporting the vehicle 10 from one location to another, certain components must be removed to comply with regulations which establish maximum width and height of transported vehicles. Using the fluid cylinder 54, the boom arm 42 is lowered to the ground. The boom arm 42 is then disconnected from the vehicle by removing the connection of the first end portion 44 from the pipelayer second portion 36, and removing the connection of the cylinder second end portion 58 from the boom arm second end portion 46. The second retaining pin assembly 116 is then removed from its connection with the pipelayer frame first portion 34 and the support member shaft portion 70. Using some type of auxiliary device, such as a come-along, the fluid cylinder 54 is raised and rotated until it is above and approximately parallel to the track assembly 22. The fluid cylinder can rotate in view of its connection with the support member 68, and in view of the shaft portion 70 of the support member 68 being supported within the bore 64. The fluid cylinder 54 is rotated and lowered until the second bracket assembly 96 engages the first bracket assembly 94 and the holes 112 and 114 are aligned with the holes 108 and 110. The pin portion 118 of the pin assembly 116 is then inserted through the aligned holes 108, 110, 112, 114 and the flange portion 120 is secured to the block 124 by the threaded fastener 122. The fluid cylinder 54 is now securely positioned on the vehicle 10 and the vehicle 10 can be transported.

When the vehicle 10 reaches its destination, the above procedure can be reversed and the boom arm can be re-attached to the pipelayer frame second portion 36 and to the fluid cylinder second end portion 58. The vehicle 10 is then ready to perform its pipe manipulating function.

Other aspects, objects, and advantages of this invention can be obtained from a study of the drawings, the disclosure, and the appended claims.

We claim:

1. A vehicle for manipulating pipe comprising:
a main frame assembly having opposed sides;
first and second self-laying track assemblies, each being connected to a respective side of said main frame assembly, each track assembly having a roller frame;
a pipelayer frame having a first portion secured to said main frame assembly and a second portion secured to one of said roller frames;
a boom arm having first and second end portions, said first end portion being connectable to said second portion of said pipelayer frame;

a fluid powered cylinder having first and second end portions, said first end portion being connectable to said pipelayer frame and said second end portion being connectable to said boom arm second end portion;

first means for rotating said fluid powered cylinder, including a recessed socket defined within said pipelayer frame first portion and a support member having a shaft portion, said shaft portion being adapted to mate with said socket;

a releasable retaining pin, said pin being adapted to penetrate said pipelayer frame first portion and said shaft portion of said support member and secure said shaft portion against rotation and against movement out of said socket; and second means for supporting said second end portion of said fluid powered cylinder on said main frame assembly.

2. The vehicle, as set forth in claim 1, wherein said support member includes a connecting portion, said connecting portion being adapted to receive and support said first end portion of said fluid powered cylinder.

3. The vehicle, as set forth in claim 1, wherein said second means for supporting said second end portion of said fluid powered cylinder includes a first bifurcated bracket assembly secured to said main frame assembly and a second bifurcated bracket assembly secured to said fluid powered cylinder.

4. The vehicle, as set forth in claim 3, including a releasable retaining pin adapted to penetrate said first and second aligned bifurcated bracket assemblies.

5. The vehicle, as set forth in claim 3, wherein said main frame assembly includes a radiator guard and said first bifurcated bracket assembly is secured to said radiator guard.

6. The vehicle, as set forth in claim 1, wherein said support member includes a radially extending flange and said pipelayer frame first portion defines a counterbore, said flange being adapted to be seated in said counterbore.

7. The vehicle, as set forth in claim 6, where said flange has an outer circumferential wall, said wall defining a groove, and a seal being positioned within said groove.

8. The vehicle, as set forth in claim 6, including a plurality of arcuately shaped releasable retaining plates and a plurality of threaded fasteners, said retaining plates being adapted to overlap said flange and said threaded fasteners being adapted to secure said retaining plates to said pipelayer frame first portion.

9. A self-laying track-type vehicle for supporting and manipulating large diameter pipe, comprising;

a main frame assembly having opposed sides, and including a radiator guard;

first and second endless track assemblies, each of said track assemblies having a roller frame, each roller frame being connected to a respective side of said main frame assembly;

a pipelayer frame having first and second portions, said first portion defining a bore and a counterbore, said first portion being secured to said main frame and said second portion being secured to one of said roller frames;

a pipe support arm having first and second end portions, said firs end portion being connectable to said second portion of said pipelayer frame;

a cylinder support member having a shaft portion, a flange portion, and a connecting portion, said shaft portion being adapted to fit within said bore, and said flange portion being adapted to fit within said counterbore;

a releasable retaining pin, said pin being adapted to penetrate said pipelayer frame firs portion and said shaft portion of said support member and secure said shaft portion against rotation and against movement out of said bore;

a fluid powered cylinder having firs and second end portions, said firs end portion being connectable to said support member connecting portion and said second end portion being releasably connectable to said second end portion of said pipe support arm; and means for supporting said second end portion of said fluid powered cylinder on said radiator guard.

10. The vehicle as set forth in claim 9, wherein said supporting means includes a first bracket assembly secured to said radiator guard, a second bracket assembly secured to said fluid powered cylinder, and a retaining pin adapted to secure said second bracket assembly to said first bracket assembly.

11. A method of preparing a pipelaying track-type vehicle for transportation, said vehicle having a main frame assembly, a pipelayer frame a pipe supporting boom arm, a support member, a retaining pin assembly securing said support member to said pipelayer frame, a fluid powered cylinder connected to said boom arm and to said support member, a first bracket assembly secured to said main frame assembly, and a second bracket assembly secured to said fluid powered cylinder, said method comprising the steps of:

removing said boom arm from said vehicle, including disconnecting said boom arm from said pipelayer frame and disconnecting said fluid powered cylinder from said boom arm;

removing said retaining pin assembly from said pipelayer frame and said support member;

rotating said support member and said fluid powered cylinder to a position where said second bracket assembly engages said first bracket assembly; and inserting said retaining pin assembly through said first and second bracket assemblies.

12. The method, as set forth in claim 11, including the step of securing said retaining pin assembly to said first bracket assembly.

* * * * *